(12) United States Patent
Zhan

(10) Patent No.: US 8,838,447 B2
(45) Date of Patent: Sep. 16, 2014

(54) METHOD FOR CLASSIFYING VOICE CONFERENCE MINUTES, DEVICE, AND SYSTEM

(71) Applicant: Huawei Technologies Co., Ltd., Guangdong (CN)

(72) Inventor: Wuzhou Zhan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/093,127

(22) Filed: Nov. 29, 2013

(65) Prior Publication Data

US 2014/0163970 A1   Jun. 12, 2014

(30) Foreign Application Priority Data

Nov. 29, 2012   (CN) .......................... 2012 1 0499273

(51) Int. Cl.
   *G10L 17/00*   (2013.01)
(52) U.S. Cl.
   USPC .................... 704/235; 704/246; 379/202.01
(58) Field of Classification Search
   USPC ....................................................... 704/235
   See application file for complete search history.

(56) References Cited

U.S. PATENT DOCUMENTS

| | | | |
|---|---|---|---|
| 2004/0001137 A1 | 1/2004 | Cutler et al. | |
| 2009/0086949 A1* | 4/2009 | Caspi et al. | 379/202.01 |
| 2009/0086993 A1 | 4/2009 | Kawaguchi et al. | |
| 2009/0089055 A1* | 4/2009 | Caspi et al. | 704/235 |
| 2009/0198495 A1* | 8/2009 | Hata | 704/246 |
| 2009/0204399 A1* | 8/2009 | Akamine | 704/235 |

FOREIGN PATENT DOCUMENTS

| | | |
|---|---|---|
| CN | 1738412 A | 2/2006 |
| CN | 101398475 A | 4/2009 |
| CN | 101582951 A | 11/2009 |
| CN | 1479525 B | 5/2010 |
| CN | 102436812 A | 5/2012 |
| CN | 102509548 A | 6/2012 |
| CN | 102572372 A | 7/2012 |
| CN | 102625077 A | 8/2012 |
| CN | 102968991 A | 3/2013 |
| GB | 2351628 A | 1/2001 |
| JP | 2004023661 A | 1/2004 |
| JP | 2007233239 A | 9/2007 |
| JP | 2007256498 A | 10/2007 |

* cited by examiner

*Primary Examiner* — Daniel D Abebe
(74) *Attorney, Agent, or Firm* — Leydig, Voit & Mayer, Ltd.

(57) ABSTRACT

Embodiments of the present invention provide a method, device, and system for classifying voice conference minutes. The method is: performing voice source locating according to audio data of the conference site so as to acquire a location of a voice source corresponding to the audio data, writing the location of the voice source into additional field information of the audio data, writing a voice activation flag into the additional field information, packaging the audio data as an audio code stream, and sending the audio code stream and the additional field information of the audio code stream to a recording server, so that the recording server classifies the audio data according to the additional field information and writes a participant identity that corresponds to the location of the voice source corresponding to the audio data into the additional field information of the audio code stream.

22 Claims, 6 Drawing Sheets

A recording server receives an audio code stream of a conference site and additional field information of the audio code stream from a multipoint control unit, where the additional field information of the audio code stream includes a location of a voice source corresponding to the audio code stream — S201

The recording server stores audio data decoded from the audio code stream in a code stream file to which a conference site number to which the audio code stream belongs and the location of the voice source corresponding to the audio code stream corresponds, and sends the audio data in the code stream file to a voiceprint identification system — S202

The recording server receives a voiceprint identification result from the voiceprint identification system, where the voiceprint identification result includes a participant identity that corresponds to the location of the voice source corresponding to the audio data, and writes the participant identity that corresponds to the voice source location corresponding to the audio data into the additional field information of the audio code stream — S203

US 8,838,447 B2

METHOD FOR CLASSIFYING VOICE CONFERENCE MINUTES, DEVICE, AND SYSTEM

CROSS-REFERENCE TO RELATED APPLICATIONS

This application claims priority to Chinese Patent Application No. 201210499273.6, filed on Nov. 29, 2012, which is hereby incorporated by reference in its entirety.

TECHNICAL FIELD

The present invention relates to the communications field, and in particular to a method, device, and system for classifying voice conference minutes.

BACKGROUND

With the fast development of video conference technologies, a demand for recording conference minutes, which is similar to that for manual generation of conference minutes in a common conference process, also exists in a multipoint video conference. An existing product can automatically record content of an entire conference, such as audio, video, and data, in a video conference process. However, if only audio and video data is recorded, an organizing requirement for classifying the conference minutes according to the speakers fails to be met when the important content or specific content of the conference needs to be reviewed.

In an ongoing video conference, if it can be determined that only one person speaks in an entire voice file, the voice data of the entire file can be directly sent to a voiceprint identification system for identification. If more than one person's voices exist in the voice file, the voice file needs to be segmented and then the voiceprint identification needs to be performed on each segment of the voice data. An existing voiceprint identification system generally requires the voice data more than 10 seconds. The longer the voice data is, the higher the accuracy is. Therefore, a segment cannot be too short during the segmentation of the voice data. Because a considerable number of free talk scenarios exist in the video conference, a voice segment may include more than one person's voices when a segment of the voice data is relatively long. An identification result is not reliable when the segment of the voice data of more than one person is sent to the voiceprint identification system for identification.

SUMMARY

Embodiments of the present invention provide a method, device, and system for classifying voice conference minutes that are capable of performing voiceprint identification on voice data in a conference site according to a location of a speaker, thereby improving accuracy of the voiceprint identification and further improving reliability of classification of the voice conference minutes.

To achieve the preceding objectives, the embodiments of the present invention adopt the following technical solutions:

According to a first aspect, a method for classifying voice conference minutes is provided, including:

performing voice source locating according to audio data of a conference site so as to acquire a location of a voice source corresponding to the audio data, and writing the location of the voice source into additional field information of the audio data;

packaging the audio data as an audio code stream and sending the audio code stream and additional field information of the audio code stream to a recording server, so that the recording server classifies the audio data according to the additional field information.

In a first possible implementation manner, with reference to the first aspect, before the packaging the audio data as an audio code stream and sending the audio code stream and additional field information of the audio code stream to a recording server, the method further includes:

writing a voice activation flag into the additional field information, where the audio activation flag is an active flag or an inactive flag, so that the recording server performs detection on the voice activation flag in the additional field information of the audio data before sending decoded audio data to a voiceprint identification system and sends the audio data to the voiceprint identification system when the voice activation flag is the active flag.

In a second possible implementation manner, with reference to the first possible implementation manner of the first aspect, the writing a voice activation flag into the additional field information includes:

performing voice activation detection on the audio data to identify whether the audio data is voice data; if the audio data is the voice data, writing the voice activation flag into the additional field information as the active flag; and if the audio data is not the voice data, writing the voice activation flag into the additional field information as the inactive flag.

According to a second aspect, a method for classifying voice conference minutes is provided, including:

receiving an audio code stream of a conference site and additional field information of the audio code stream from a multipoint control unit, where the additional field information of the audio code stream includes a location of a voice source corresponding to the audio code stream;

storing audio data decoded from the audio code stream in a code stream file to which a number of a conference site that outputs the audio stream and the location of the voice source corresponding to the audio code stream correspond, and sending the audio data in the code stream file to a voiceprint identification system; and receiving a voiceprint identification result from the voiceprint identification system, where the voiceprint identification result includes a participant identity that corresponds to the location of the voice source corresponding to the audio data, and writing the participant identity that corresponds to the location of the voice source corresponding to the audio data into the additional field information of the audio code stream.

In a first possible implementation manner, with reference to the second aspect, after the storing audio data decoded from the audio code stream in a code stream file to which a conference site number to which the audio code stream belongs and the location of the voice source corresponding to the audio code stream correspond, the method further includes:

writing time information of the audio code stream into the additional field information of the audio code stream, so that when at least two audio code streams are received, the at least two audio code streams are sequenced according to the time information.

In a second possible implementation manner, with reference to the second aspect or the first possible implementation manner of the second aspect, the sending the audio data in the code stream file to a voiceprint identification system, receiving a voiceprint identification result from the voiceprint identification system, where the voiceprint identification result includes a participant identity that corresponds to the location of the voice source corresponding to the audio data, and writing the participant identity that corresponds to the location of the voice source corresponding to the audio data into the additional field information of the audio code stream includes:

sending audio data that is within a first unit time in the code stream file to the voiceprint identification system; and receiving the voiceprint identification result from the voiceprint identification system, where the voiceprint identification result includes a participant identity that corresponds to a location of a voice source corresponding to the audio data that is within the first unit time, and writing the participant identity that corresponds to the location of the voice source corresponding to the audio data that is within the first unit time into additional field information of the audio data that is within the first unit time.

In a third possible implementation manner, with reference to the second possible implementation manner of the second aspect, before the receiving the voiceprint identification result from the voiceprint identification system, the method further includes:

sending a voiceprint identification result of audio data that is within the second unit time in the code stream file to the voiceprint identification system, where the second unit time is a previous unit time to the first unit time, so that the voiceprint identification system uses the voiceprint identification result of the audio data that is within the second unit time as a reference when performing voiceprint identification on the audio data that is within the first unit time.

In a fourth possible implementation manner, with reference to the second aspect or the first possible implementation manner to the third possible implementation manner of the second aspect, before the sending the audio data in the code stream file to a voiceprint identification system, the method further includes:

detecting the additional field information of the audio data that is within the first unit time, and if voice activation flags in all additional field information of the audio data that is within the first unit time are inactive flags, skipping sending the audio data that is within the first unit time to the voiceprint identification system.

In a fifth possible implementation manner, with reference to the second aspect or the first possible implementation manner to the fourth possible implementation manner of the second aspect, before the sending the audio data in the code stream file to a voiceprint identification system, the method further includes:

detecting the location of the voice source in the additional field information of the audio code stream;

if only one location of the voice source corresponding to the audio code stream exists in the additional field information of the audio code stream, sending the code stream file to the voiceprint identification system; and if at least two locations of voice sources corresponding to the audio code stream are included in the additional field information of the audio code stream and participant identities corresponding to the at least two locations of voice sources have been identified during last voiceprint identification, writing the identified participant identities corresponding to the at least two locations of voice sources into the additional field information of the audio code stream.

According to a third aspect, a video device is provided, including:

a location acquiring unit, configured to perform voice source locating according to audio data of a conference site so as to acquire a location of a voice source corresponding to the audio data, write the location of the voice source into additional field information of the audio data, and send the audio data and the additional field information of the audio data to a sending unit; and the sending unit, configured to receive the audio data and the additional field information of the audio data from the location acquiring unit, package the audio data as an audio code stream, and send the audio code stream and additional field information of the audio code stream to a recording server, so that the recording server classifies the audio data according to the additional field information.

In a possible implementation manner, with reference to the third aspect, the video device further includes:

the flag writing unit, configured to write a voice activation flag into the additional field information, where the audio activation flag is an active flag or an inactive flag, so that the recording server performs detection on the voice activation flag in the additional field information of the audio data before sending decoded audio data to a voiceprint identification system and sends the audio data to the voiceprint identification system when the voice activation flag is the active flag.

In a second possible implementation manner, with reference to a first possible implementation manner of the third aspect, the flag writing unit is specifically configured to:

perform voice activation detection on the audio data to identify whether the audio data is voice data; if the audio data is the voice data, write the voice activation flag into the additional field information as the active flag; and if the audio data is not the voice data, write the voice activation flag into the additional field information as the inactive flag.

According to a fourth aspect, a recording server is provided, including:

a receiving unit, configured to receive an audio code stream of a conference site and additional field information of the audio code stream from a multipoint control unit, where the additional field information of the audio code stream includes a location of a voice source corresponding to the audio code stream, and send the audio code stream to a classification and identification unit;

the classification and identification unit, configured to receive the audio code stream from the receiving unit, store audio data decoded from the audio code stream in a code stream file to which a conference site number to which the audio code stream belongs and the location of the voice source corresponding to the audio code stream correspond, and send the audio data in the code stream file to a voiceprint identification system; and an identity matching unit, configured to receive a voiceprint identification result from the voiceprint identification system, where the voiceprint identification result includes a participant identity that corresponds to the location of the voice source corresponding to the audio data, and write the participant identity that corresponds to the location of the voice source corresponding to the audio data into the additional field information of the audio code stream.

In a first possible implementation manner, with reference to the fourth aspect, the recording server further includes:

a sequencing unit, configured to write time information of the audio code stream into the additional field information of the audio code stream, so that when at least two audio code streams are received, the at least two audio code streams are sequenced according to the time information.

In a second possible implementation manner, with reference to the fourth aspect or the first possible implementation manner of the fourth aspect, the classification and identification unit is specifically configured to send audio data that is within a first unit time in the code stream file to the voiceprint identification system; and the identity matching unit is specifically configured to receive the voiceprint identification result from the voiceprint identification system, where the voiceprint identification result includes a participant identity that corresponds to a location of a voice source corresponding to the audio data that is within the first unit time, and write the participant identity that corresponds to the location of the voice source corresponding to the audio data that is within the first unit time into additional field information of the audio data that is within the first unit time.

In a third possible implementation manner, with reference to the second possible implementation manner of the fourth aspect, the classification and identification unit is further specifically configured to send a voiceprint identification result of audio data that is within the second unit time in the code stream file to the voiceprint identification system, where the second unit time is a previous unit time to the first unit time, so that the voiceprint identification system uses the voiceprint identification result of the audio data that is within the second unit time as a reference when performing voiceprint identification on the audio data that is within the first unit time.

In a fourth possible implementation manner, with reference to the fourth aspect or the first possible implementation manner to the third possible implementation manner of the fourth aspect, before the sending the audio data in the code stream file to a voiceprint identification system, the classification and identification unit is further configured to:

detect the additional field information of the audio data that is within the first unit time, and if voice activation flags in all additional field information of the audio data that is within the first unit time are inactive flags, skip sending the audio data that is within the first unit time to the voiceprint identification system.

In a fifth possible implementation manner, with reference to the fourth aspect or the first possible implementation manner to the fourth possible implementation manner of the fourth aspect, before the sending the audio data in the code stream file to a voiceprint identification system, the classification and identification unit is further specifically configured to detect a location of a voice source in the additional field information of the audio code stream;

if only one location of the voice source corresponding to the audio code stream exists in the additional field information of the audio code stream, the classification and identification unit is further specifically configured to send the code stream file to the voiceprint identification system; and if at least two locations of voice sources corresponding to the audio code stream are included in the additional field information of the audio code stream and participant identities corresponding to the at least two locations of the voice sources have been identified during last voiceprint identification, the identity matching unit is further specifically configured to write the identified participant identities corresponding to the at least two locations of the voice sources into the additional field information of the audio code stream.

According to a fifth aspect, a video conference system is provided, including a voiceprint identification system and a multipoint control unit and further including the video device and the recording server.

According to the method for classifying voice conference minutes, the device, and the system that are provided in the embodiments of the present invention, voice source locating is performed according to audio data of a conference site so as to acquire a location of a voice source corresponding to the audio data; the location of the voice source is written into additional field information of the audio data; a voice activation flag is written into the additional field information, where the voice activation flag is an active flag or an inactive flag; then the audio data is packaged as an audio code stream, and the audio code stream and additional field information of the audio code stream are sent to a recording server, so that the recording server classifies the audio data according to the additional field information, writes a participant identity that corresponds to the location of the voice source corresponding to the audio data into the additional field information of the audio code stream, and is capable of performing voiceprint identification on voice data in the conference site according to a location of a speaker. This improves accuracy of the voiceprint identification and further improves reliability of classification of the voice conference minutes.

BRIEF DESCRIPTION OF DRAWINGS

To illustrate the technical solutions in the embodiments of the present invention more clearly, the following briefly introduces the accompanying drawings required for describing the embodiments Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
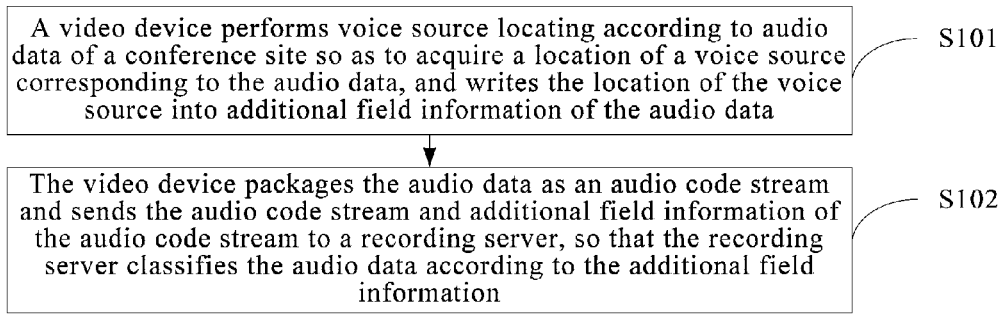
FIG. 1 is a flowchart of a method for classifying voice conference minutes according to an embodiment of the present invention.

An embodiment of the present invention provides a method for classifying voice conference minutes, and the method applies to a video conference system. The video conference system is formed by a conference site, a multipoint control unit, a recording server, and a voice identification system, where one or more video devices and microphones are included in the conference site. As shown in FIG. 1, the method based on a video device side includes:

S101. A video device performs voice source locating according to audio data of a conference site so as to acquire a location of a voice source corresponding to the audio data and writes the location of the voice source into additional field information of the audio data.

S102. The video device packages the audio data as an audio code stream and sends the audio code stream and additional field information of the audio code stream to a recording server, so that the recording server classifies the audio data according to the additional field information.

Further, before S102 is executed, the method may further include: writing, by the video device, a voice activation flag into the additional field information, where the voice activation flag is an active flag or an inactive flag, so that the recording server performs detection on the voice activation flag in the additional field information of the audio data before sending decoded audio data to the voiceprint identification system and sends the audio data to the voiceprint identification system when the voice activation flag is the active flag.

Exemplarily, voice activation detection may be performed on the audio data to identify whether the audio data is voice data. If the audio data is the voice data, the voice activation flag is written in the additional field information as the active flag. If the audio data is not the voice data, the voice activation flag is written in the additional field information as the inactive flag.

It should be noted that, generally, the video device needs to send the audio code stream and the additional field information of the audio code stream to a multipoint control unit (Multipoint-Control Unit, MCU) and the multipoint control unit forwards them to the recording server.

Figure 2:
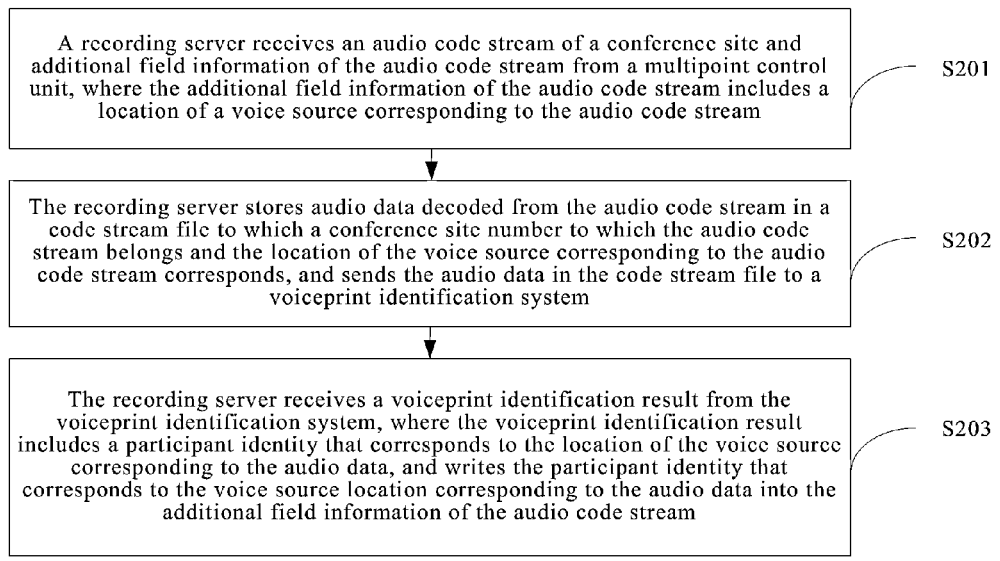
FIG. 2 is a flowchart of another method for classifying voice conference minutes according to an embodiment of the present invention.

Another method for classifying voice conference minutes provided in an embodiment of the present invention. As shown in FIG. 2, the method based on a recording server side includes:

S201. A recording server receives an audio code stream of a conference site and additional field information of the audio code stream from a multipoint control unit, where the additional field information of the audio code stream includes a location of a voice source corresponding to the audio code stream.

S202. The recording server stores audio data decoded from the audio code stream in a code stream file to which a conference site number to which the audio code stream belongs and the location of the voice source corresponding to the audio code stream correspond, and sends the audio data in the code stream file to a voiceprint identification system.

S203. The recording server receives a voiceprint identification result from the voiceprint identification system, where the voiceprint identification result includes a participant identity that corresponds to the location of the voice source corresponding to the audio data, and writes the participant identity that corresponds to the location of the voice source corresponding to the audio data into the additional field information of the audio code stream.

According to the method for classifying voice conference minutes provided in this embodiment of the present invention, voice source locating is performed according to audio data of a conference site so as to acquire a location of a voice source corresponding to the audio data; the location of the voice source is written into additional field information of the audio data; a voice activation flag is written into the additional field information, where the voice activation flag is an active flag or an inactive flag; then the audio data is packaged as an audio code stream, and the audio code stream and additional field information of the audio code stream are sent to a recording server, so that the recording server classifies the audio data according to the additional field information, writes a participant identity that corresponds to the location of the voice source corresponding to the audio data into the additional field information of the audio code stream, and is capable of performing voiceprint identification on voice data in the conference site according to a location of a speaker. This improves accuracy of the voiceprint identification and further improves reliability of classification of the voice conference minutes.

Figure 3A:
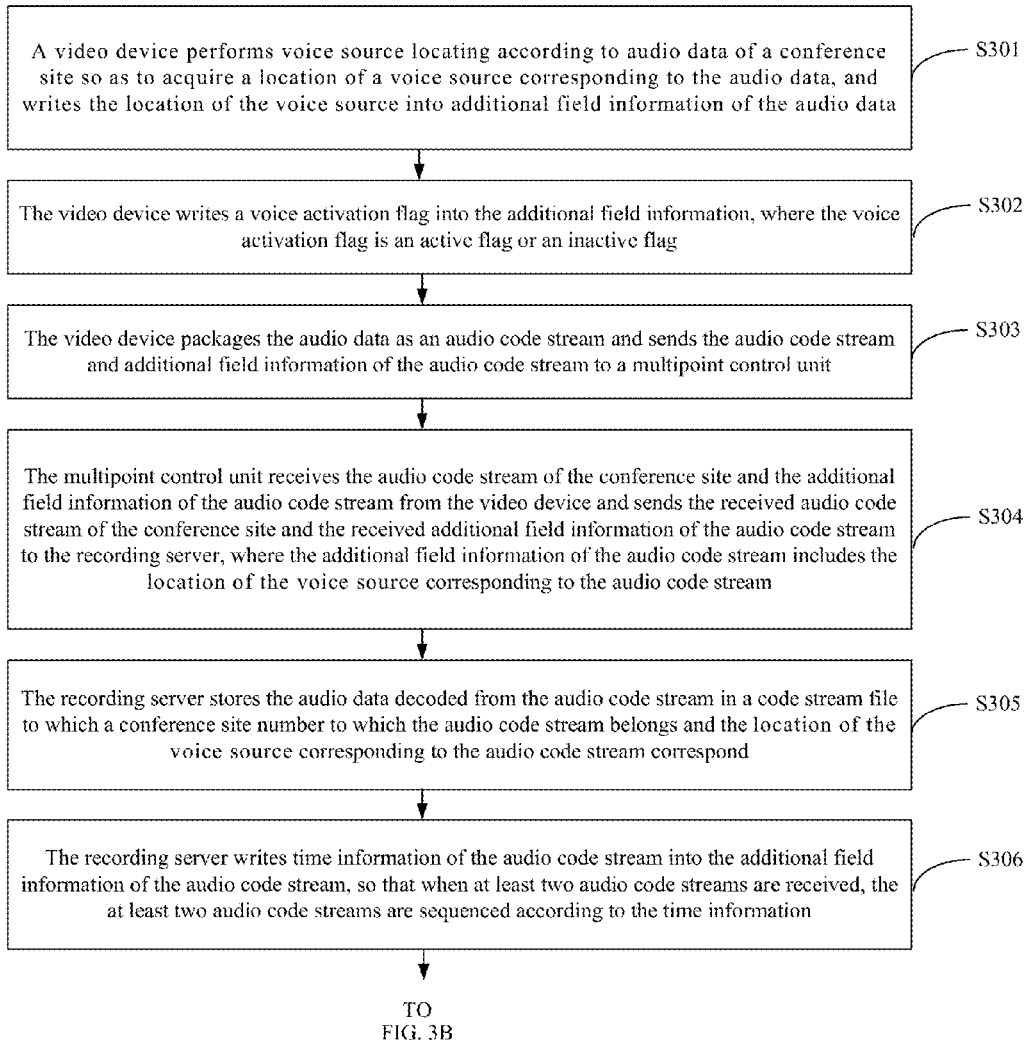
FIG. 3A and FIG. 3B are flowchart of a method for classifying voice conference minutes according to another embodiment of the present invention.
Figure 3B:
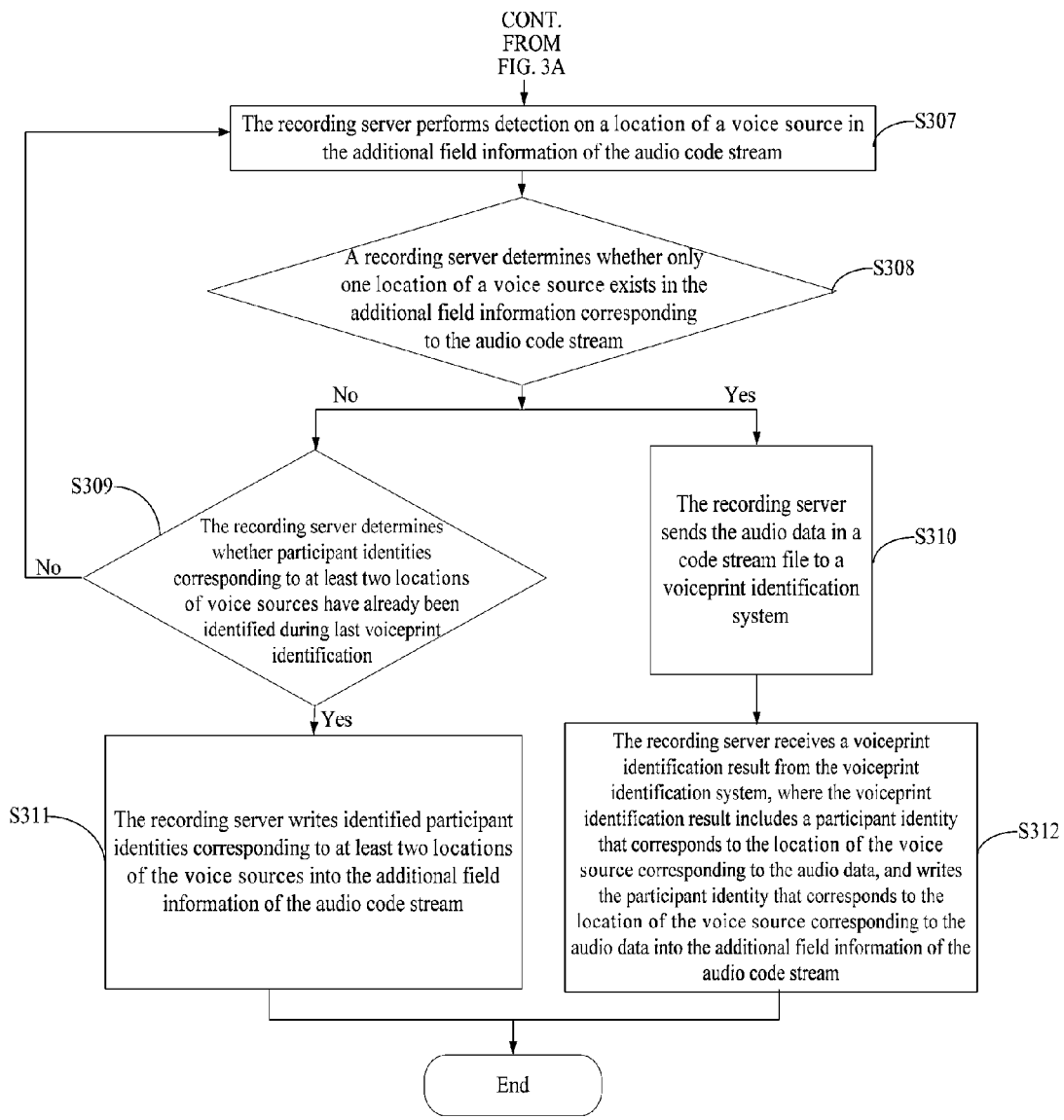

As shown in FIG. 3, a method for classifying voice conference minutes according to still another embodiment of the present invention, includes:

S301. A video device performs voice source locating according to audio data of a conference site so as to acquire a location of a voice source corresponding to the audio data, and writes the location of the voice source into additional field information of the audio data.

Specifically, the location of the voice source in the conference site may be acquired by using a voice source locating technology. According to the voice source locating technology, a voice signal is picked up by using a microphone array, and a digital signal processing technology is used to analyze and process the voice signal so as to obtain the location of the voice source.

S302. The video device writes a voice activation flag into the additional field information, where the voice activation flag is an active flag or an inactive flag.

Alternatively, the video device needs to identify whether the audio data is voice data before writing the voice activation flag into the additional field information. Specifically, VAD (Voice Activation Detection, voice activation detection) processing may be performed identify whether the audio data is voice data. The voice activation detection is performed for the audio data so as to identify whether the audio data is voice data. If the audio data is the voice data, the voice activation flag is written in the additional field information as the inactive flag; and if the audio data is not the voice data, the voice activation flag is written in the additional field information as the inactive flag.

The purpose is to identify non-voice data from a signal stream of the audio data, so that the non-voice data is not identified during voiceprint identification, thereby saving resources.

S303. The video device packages the audio data as an audio code stream and sends the audio code stream and additional field information of the audio code stream to a multipoint control unit.

Specifically, before the video device sends the audio code stream of the conference site and the additional field information of the audio code stream to a recording server, the audio code stream and the additional field information of the audio code stream may be received from the video device by using the MCU, and the audio code stream and the additional field information of the audio code stream are forwarded to the NRS (Recording server, recording server), where the additional field information of the audio code stream includes a location of a voice source corresponding to the audio code stream.

The multipoint control unit, serving as a kernel part of a video conference system, may provide a connection service for a user of a video conference, such as a group conference and a multi-group conference for a video conference user. When the video device sends the packaged audio code stream and the additional field information of the audio code stream to the multipoint control unit, the audio code stream and the additional field information are transmitted through different channels.

S304. The multipoint control unit receives the audio code stream of the conference site and the additional field information of the audio code stream from the video device and sends the received audio code stream of the conference site and the received additional field information of the audio code stream to the recording server, where the additional field information of the audio code stream includes the location of the voice source corresponding to the audio code stream.

Because the audio code stream and the additional field information that are received by the multipoint control unit are packaged, the multipoint control unit, after receiving the audio code stream and the additional field information, needs to decode the received audio code stream and the received additional field information of the audio code stream by using a decoder so as to recover the audio code stream and the additional field information, where the additional field information of the audio code stream includes the location of the voice source corresponding to the audio code stream.

Further, when audio code streams are sent from multiple conference sites, the multipoint control unit may sequence the conference sites according to sizes of audio code stream gains of the conference sites and additional field information of the audio code streams, and select top N conference sites that have maximum audio code stream gains. For example, top 3 conference sites or top 4 conference sites that have a maximum audio code stream gain among the conference sites may be selected. Then, the multipoint control unit sends audio code streams of top N conference sites that have maximum voice volume and the additional field information of the audio code streams to the recording server.

S305. The recording server stores the audio data decoded from the audio code stream in a code stream file to which a conference site number to which the audio code stream belongs and the location of the voice source corresponding to the audio code stream correspond.

Exemplarily, when receiving the maximum audio code streams of top N conference sites selected by the multipoint control unit and the additional field information of the audio code streams, the recording server may create corresponding code stream files according to the conference site numbers of the conference sites to which the audio code streams belongs and the location of the voice sources in the additional field information of the audio code streams, and store the audio code streams in the corresponding code stream files. In this way, the audio code streams are associated with the conference sites and the location of the voice sources, and accurate classification of the audio code streams is implemented. Therefore, participant identities of the locations of the voice sources of the audio code streams in the conference sites can be accurately identified during voiceprint identification.

S306. The recording server writes time information of the audio code stream into the additional field information of the audio code stream, so that when at least two audio code streams are received, the at least two audio code streams are sequenced according to the time information.

After the recording server stores the decoded audio data in the code stream file to which the conference site number to which the audio code stream belongs and the location of the voice source corresponding to the audio code stream correspond, the recording server needs to write the time information of the audio code stream into the additional field information of the audio code stream, so that when at least two audio code streams are received, the at least two audio code streams are sequenced according to the time information. Specifically, at the same time when the conference minutes are recorded, speaking sequences of participants need to be sequenced. Therefore, time information of received audio code streams needs to be written into the additional field information of the audio code streams, so that the audio code streams in the conference sites are sequenced according to the time information and the conference minutes are recorded clearly and accurately.

S307. The recording server performs detection on the location of the voice source in the additional field information of the audio code stream.

S308. The recording server determines whether only one location of the voice source exists in the additional field information corresponding to the audio code stream; if at least two locations of the voice sources corresponding to the audio code streams are included in the additional field information of the audio code stream, performs S309; and if only one location of the voice source corresponding to the audio code stream exists in the additional field information of the audio code stream, performs S310.

S309. The recording server determines whether participant identities corresponding to the at least two locations of the voice sources have already been identified during last voiceprint identification; if the participant identities corresponding to the at least two locations of the voice sources have been identified during the last voiceprint identification, performs S311; and if the participant identities corresponding to the at least two locations of the voice sources have not been identified during the last voiceprint identification, performs S307-S309 again.

S310. The recording server sends the audio data in the code stream file to a voiceprint identification system (The Voiceprint identification System, VPS), and then performs S312.

Before the recording server sends the audio data in the code stream file to the voiceprint identification system, the recording server needs to detect additional field information of audio data that is within a first unit time. If the voice activation flags in all additional field information of the audio data that is within the first unit time are inactive flags, no audio data that is within the first unit time is sent to the voiceprint identification system.

Specifically, the recording server performs detection on a voice activation flag in additional field information of an audio code stream that belongs to a certain location of a certain conference site, where the additional field information is stored within an n-th unit time. If voice activation flags in all additional field information of the audio code stream are inactive flags, no processing is performed. In this way, when voice activation flags in additional field information of an audio code stream that belongs to a certain location of a certain conference site are inactive flags, where the additional field information is stored within the n-th unit time, it indicates that the audio data is not voice data and the audio data does not need to be sent to the voiceprint identification system for detection, thereby saving resources.

Exemplarily, the time length of the unit time may be set according to an actual condition. For example, the time length of the unit time may be set to 1 min.

A voiceprint identification technology is a biometric authentication technology and is also called speaker identification. Specifically, the voiceprint identification system may match a voiceprint feature of voice data to be identified with all voiceprints in a voiceprint database so as to identify a speaker identity. Generally, stored voice data more than 10 seconds is required for performing reliable identification. The longer the data is, the higher the accuracy is.

S311. The recording server writes identified participant identities corresponding to the at least two locations of voice sources into the additional field information of the audio code stream.

Specifically, when at least two locations of the voice sources exist in additional field information of a segment of an audio code stream, an identification error may be caused if the audio code stream is sent to the voiceprint identification system. Therefore, when at least two voice locations exist in the additional field information of the audio code stream, name information of the locations has been detected, and voiceprint identification is no longer performed for the audio code stream. Instead, detected participant identities corresponding to the locations, that is, the name information, is directly written into name information of the additional field of the audio code stream on which location overlapping exists. In this way, a purpose for identifying a location of a voice source is implemented in a case where many persons are speaking at the same time and accuracy of classification of the conference minutes increases.

S312. The recording server receives a voiceprint identification result from the voiceprint identification system, where the voiceprint identification result includes a participant identity that corresponds to the location of the voice source corresponding to the audio data, and writes the participant identity that corresponds to the location of the voice source corresponding to the audio data into the additional field information of the audio code stream.

Exemplarily, the recording server may store audio data decoded from an audio code stream that is within the first unit time in a code stream file to which a conference site number to which the audio code stream belongs and a location of a voice source corresponding to the audio code stream correspond and sends the audio data that is within the first unit time in the code stream file to the voiceprint identification system.

Then the recording server receives the voiceprint identification result from the voiceprint identification system, where the voiceprint identification result includes a participant identity that corresponds to a location of a voice source corresponding to the audio data that is within the first unit time, and writes the participant identity that corresponds to the location of the voice source corresponding to the audio data that is within the first unit time into the additional field information of the audio data that is within the first unit time.

Alternatively, preferentially, before the voiceprint identification result is received from the voiceprint identification system, the method may further include: sending a voiceprint identification result of audio data that is within the second unit time in the code stream file to the voiceprint identification system, where the second unit time is a previous unit time to the first unit time, so that the voiceprint identification result of the audio data that is within the second unit time is used as a reference when the voiceprint identification system performs voiceprint identification on the audio data that is within the first unit time. In this way, a voiceprint identification speed may increase when identification is performed in a case where a previous identification result is used as a reference.

According to the method for classifying voice conference minutes provided in this embodiment of the present invention, voice source locating is performed according to audio data of a conference site so as to acquire a location of a voice source corresponding to the audio data; the location of the voice source is written into additional field information of the audio data; a voice activation flag is written into the additional field information, where the voice activation flag is an active flag or an inactive flag; then the audio data is packaged as an audio code stream, and the audio code stream and additional field information of the audio code stream are sent to a recording server, so that the recording server classifies the audio data according to the additional field information, writes a participant identity that corresponds to the location of the voice source corresponding to the audio data into the additional field information of the audio code stream, and is capable of performing voiceprint identification on voice data in the conference site according to a location of a speaker. This improves accuracy of the voiceprint identification and further improves reliability of classification of the voice conference minutes.

Figure 4:
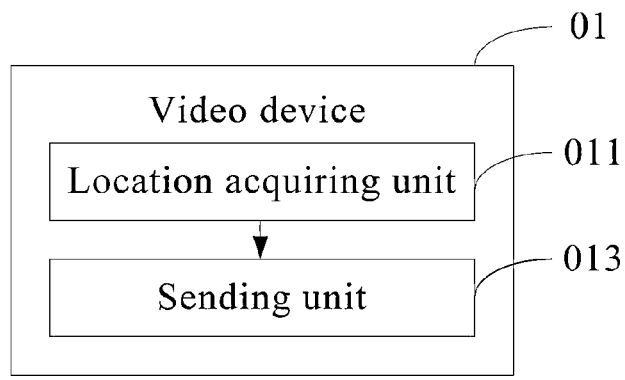
FIG. 4 is a schematic structural diagram of a video device according to still another embodiment of the present invention.

As shown in FIG. 4, still another embodiment of the present invention provides a video device 01, including:

a location acquiring unit 011, configured to perform voice source locating according to audio data of a conference site so as to acquire a location of a voice source corresponding to the audio data, write the location of the voice source into additional field information of the audio data, and send the audio data and the additional field information of the audio data to a sending unit 013; and the sending unit 013, configured to receive the audio data and the additional field information of the audio data from the location acquiring unit 011, package the audio data as an audio code stream, and send the audio code stream and additional field information of the audio code stream to a recording server, so that the recording server classifies the audio data according to the additional field information.

Figure 5:
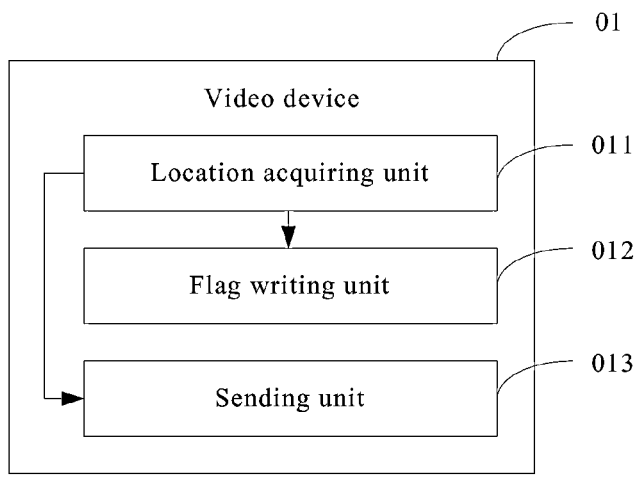
FIG. 5 is a schematic structural diagram of another video device according to still another embodiment of the present invention.

Further, as shown in FIG. 5, the video device 01 may further include:

a flag writing unit 012, configured to receive the additional field information from the location acquiring unit 011 before the audio data and the additional field information of the audio data are sent to the sending unit 013, write a voice activation flag into the additional field information, where the voice activation flag is an active flag or an inactive flag, and then send the additional field information to the sending unit 013, so that the recording server performs detection on the voice activation flag in the additional field information of the audio data before sending decoded audio data to a voiceprint identification system and sends the audio data to the voiceprint identification system when the voice activation flag is the active flag.

The flag writing unit 012 may be specifically configured to:

perform voice activation detection on the audio data to identify whether the audio data is voice data; if the audio data is the voice data, write the voice activation flag into the additional field information as the active flag; and if the audio data is not the voice data, write the voice activation flag into the additional field information as the inactive flag.

According to a video device provided in this embodiment of the present invention, voice source locating is performed according to audio data of a conference site so as to acquire a location of a voice source corresponding to the audio data, the location of the voice source is written into additional field information of the audio data, a voice activation flag is written into the additional field information, the audio data is packaged as an audio code stream, and the audio code stream and additional field information of the audio code stream are sent to a recording server, so that the recording server classifies the audio data according to the additional field information and is capable of performing voiceprint identification on voice data in the conference site according to a location of a speaker. This improves accuracy of the voiceprint identification and further improves reliability of classification of voice conference minutes.

Figure 6:
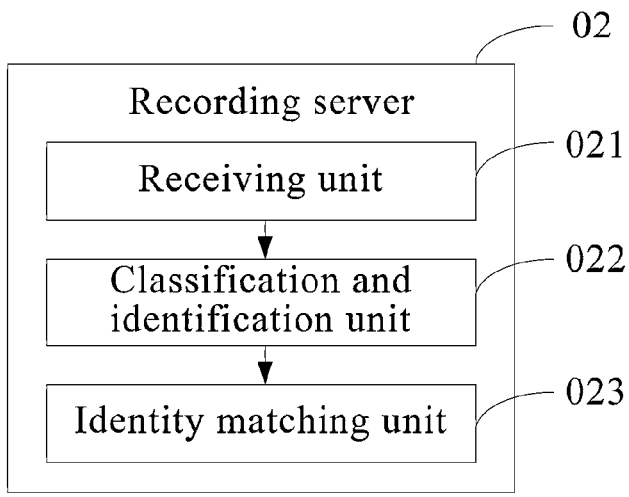
FIG. 6 is a schematic structural diagram of a recording server according to still another embodiment of the present invention.

As shown in FIG. 6, still another embodiment of the present invention provides a recording server 02, including:

a receiving unit 021, configured to receive an audio code stream of a conference site and additional field information of the audio code stream from a multipoint control unit, where the additional field information of the audio code stream includes a location of a voice source corresponding to the audio code stream, and send the audio code stream to a classification and identification unit 022;

the classification and identification unit 022, configured to receive the audio code stream from the receiving unit 021, store audio data decoded from the audio code stream in a code stream file to which a conference site number to which the audio code stream belongs and the location of the voice source corresponding to the audio code stream correspond, and send the audio data in the code stream file to a voiceprint identification system; and an identity matching unit 023, configured to receive a voiceprint identification result from the voiceprint identification system of the classification and identification unit 022, where the voiceprint identification result includes a participant identity that corresponds to a location of a voice source corresponding to the audio data, and write the participant identity that corresponds to the location of the voice source corresponding to the audio data into the additional field information of the audio code stream.

Figure 7:
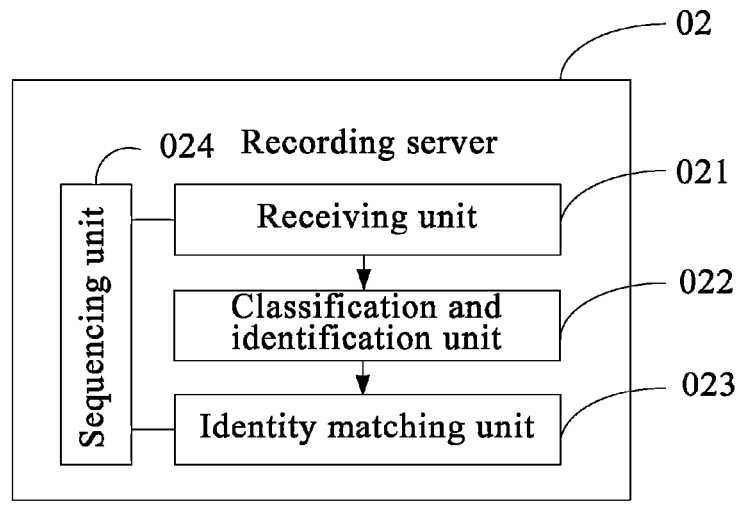
FIG. 7 is a schematic structural diagram of another recording server according to still another embodiment of the present invention.

Further, as shown in FIG. 7, the recording server 02 may further include:

a sequencing unit 024, configured to write time information of the audio code stream into the additional field information of the audio code stream, so that when at least two audio code streams are received, the at least two audio code streams are sequenced according to the time information.

Further, the classification and identification unit 022 may be specifically configured to store audio data decoded from an audio code stream that is within a first unit time in a code stream file to which a conference site number to which the audio code stream belongs and a location of a voice source corresponding to the audio code stream correspond, and send the audio data that is within the first unit time in the code stream file to the voiceprint identification system.

The identity matching unit 023 may be specifically configured to receive the voiceprint identification result from the voiceprint identification system, where the voiceprint identification result includes a participant identity that corresponds to a location of a voice source corresponding to the audio data that is within the first unit time, and write the participant identity that corresponds to the location of the voice source corresponding to the audio data that is within the first unit time into additional field information of the audio data that is within the first unit time.

Preferentially, before receiving the voiceprint identification result from the voiceprint identification system, the classification and identification unit 022 may be further specifically configured to send a voiceprint identification result of audio data that is within the second unit time in the code stream file to the voiceprint identification system, where the second unit time is a previous unit time to the first unit time, so that the voiceprint identification result of the audio data that is within the second unit time is used as a reference when the voiceprint identification system performs voiceprint identification on the audio data that is within the first unit time.

Further, before sending the audio data in the code stream file to the voiceprint identification system, the classification and identification unit 022 may be further specifically configured to:

detect the additional field information of the audio data that is within the first unit time, and if voice activation flags in all additional field information of the audio data that is within the first unit time are inactive flags, skip sending the audio data that is within the first unit time to the voiceprint identification system.

Further, before sending the audio data in the code stream file to the voiceprint identification system, the classification and identification unit 022 may be further specifically configured to:

detect the location of the voice source in the additional field information of the audio code stream;

if only one location of the voice source corresponding to the audio code stream exists in the additional field information of the audio code stream, the classification and identification unit 022 may be further configured to send the code stream file to the voiceprint identification system; and if at least two locations of voice sources corresponding to the audio code stream are included in the additional field information of the audio code stream and participant identities corresponding to the at least two locations of the voice sources have been identified during last voiceprint identification, the identity matching unit 023 may be further configured to write the identified participant identities corresponding to the two locations of the voice sources into the additional field information of the audio code stream.

According to a recording server provided in this embodiment of the present invention, an audio code stream of a conference site and additional field information of the audio code stream are received from a multipoint control unit, where the additional field information of the audio code stream includes a location of a voice source corresponding to the audio code stream; audio data decoded from the audio code stream is stored in a code stream file to which a conference site number to which the audio code stream belongs and the location of the voice source corresponding to the audio code stream correspond; the code stream file is sent to a voiceprint identification system; a voiceprint identification result is received from the voiceprint identification system; and a participant identity that corresponds to the location of the voice source corresponding to the audio data is written into additional field information of the audio data. Therefore, voiceprint identification can be performed for the audio data in the conference site according to speaker locations. This improves accuracy of the voiceprint identification and further improves reliability of classification of voice conference minutes.

Figure 8:
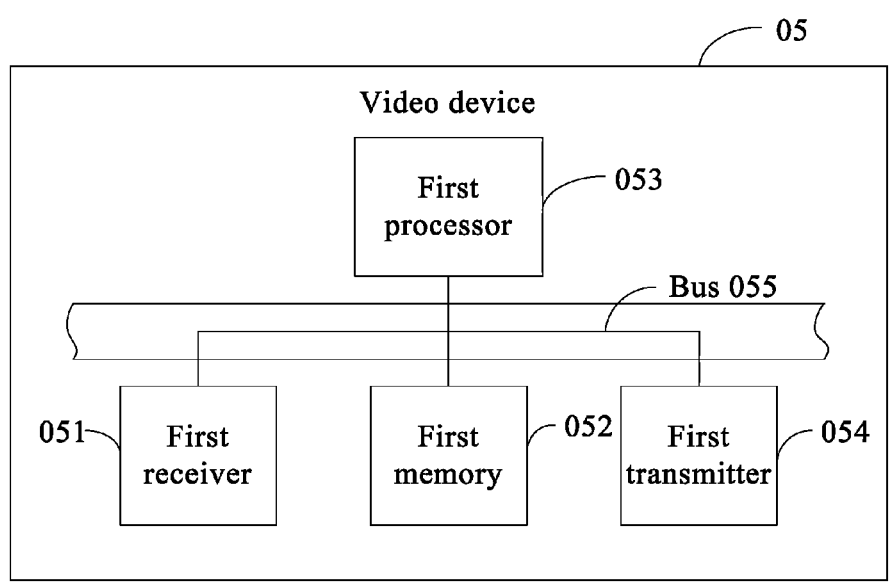
FIG. 8 is a schematic structural diagram of still another video device according to still another embodiment of the present invention.

As shown in FIG. 8, still another embodiment of the present invention provides a video device 05, including a first receiver 051, a first memory 052, and a bus 055, and the video device 05 further includes:

a first processor 053, configured to perform voice source locating according to audio data of a conference site so as to acquire a location of a voice source corresponding to the audio data, and write the location of the voice source into additional field information of the audio data; and a first transmitter 054, configured to package the audio data as an audio code stream and send the audio code stream and additional field information of the audio code stream to a recording server, so that the recording server classifies the audio data according to the additional field information.

Further, before packaging the audio data as the audio code stream and sends the audio code stream and the additional field information of the audio code stream to the first transmitter 054, the first processor 053 is further configured to write a voice activation flag into the additional field information, where the voice activation flag is an active flag or an inactive flag, so that the recording server performs detection on the voice activation flag in the additional field information of the audio data before sending decoded audio data to a voiceprint identification system and sends the audio data to the voiceprint identification system when the voice activation flag is the active flag. The first processor 053 may be further specifically configured to:

perform voice activation detection on the audio data to identify whether the audio data is voice data; if the audio data is the voice data, write the voice activation flag into the additional field information as the active flag; and if the audio data is not the voice data, write the voice activation flag into the additional field information as the inactive flag.

According to a video device provided in this embodiment of the present invention, voice source locating is performed according to audio data of a conference site so as to acquire a location of the voice source corresponding to the audio data, the location of the voice source is written into additional field information of the audio data, a voice activation flag is written into the additional field information, the audio data is packaged as an audio code stream, and the audio code stream and additional field information of the audio code stream are sent to a recording server, so that the recording server classifies the audio data according to the additional field information and is capable of performing voiceprint identification on voice data in the conference site according to a location of a speaker. This improves accuracy of the voiceprint identification and further improves reliability of classification of voice conference minutes.

Figure 9:
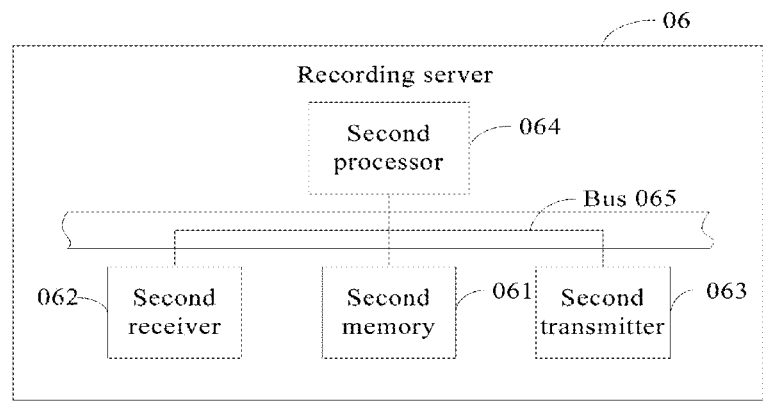
FIG. 9 is a schematic structural diagram of still another recording server according to still another embodiment of the present invention.

As shown in FIG. 9, still another embodiment of the present invention provides a recording server 06, including: a second memory 061, a second transmitter 063, and a bus 065, and the recording server further includes:

a second receiver 062, configured to receive an audio code stream of a conference site and additional field information of the audio code stream from a multipoint control unit, where the additional field information of the audio code stream includes a location of a voice source corresponding to the audio code stream.

The second memory 061 is configured to store audio data decoded from the audio code stream in a code stream file to which a conference site number to which the audio code stream belongs and the location of the voice source corresponding to the audio code stream correspond, and send the audio data in the code stream file to a voiceprint identification system by using the second transmitter 063.

The second processor 064 is configured to receive a voiceprint identification result from the voiceprint identification system, where the voiceprint identification result includes a participant identity that corresponds to the location of the voice source corresponding to the audio data, and write the participant identity that corresponds to the location of the voice source corresponding to the audio data into the additional field information of the audio code stream.

Further, after the audio data decoded from the audio code stream is stored in the code stream file to which the conference site number to which the audio code stream belongs and the location of the voice source corresponding to the audio code stream correspond, the second processor 064 may be further configured to:

write time information of the audio code stream into the additional field information of the audio code stream, so that when at least two audio code streams are received, the at least two audio code streams are sequenced according to the time information.

Further, the second memory 061 may be specifically configured to store audio data decoded from an audio code stream that is within a first unit time in a code stream file to which a conference site number to which the audio code stream belongs and a location of a voice source corresponding to the audio code stream correspond, and send the audio data in the code stream file to the voiceprint identification system by using the second transmitter 063.

The second receiver 062 may be specifically configured to receive the voiceprint identification result from the voiceprint identification system, where the voiceprint identification result includes a participant identity that corresponds to a location of a voice source corresponding to the audio data that is within the first unit time, and write the participant identity that corresponds to the location of the voice source corresponding to the audio data that is within the first unit time into additional field information of the audio data that is within the first unit time.

Further, before the voiceprint identification result is received from the voiceprint identification system, the second transmitter 063 may be used to send a voiceprint identification result of audio data that is within the second unit time in the code stream file to the voiceprint identification system, where the second unit time is a previous unit time to the first unit time, so that the voiceprint identification result of the audio data that is within the second unit time is used as a reference when the voiceprint identification system performs voiceprint identification on the audio data that is within the first unit time.

Further, before the audio data in the code stream file is sent to the voiceprint identification system, the second processor 064 may be further configured to:

detect the additional field information of the audio data that is within the first unit time, and if voice activation flags in all additional field information of the audio data that is within the first unit time are inactive flags, skip sending the audio data that is within the first unit time to the voiceprint identification system.

Further, before the audio data in the code stream file is sent to the voiceprint identification system, the second processor 064 may be further configured to:

detect the location of the voice source in the additional field information of the audio code stream;

if only one location of the voice source corresponding to the audio code stream exists in the additional field information of the audio code stream, send the code stream file to the voiceprint identification system; and if at least two locations of voice sources corresponding to the audio code stream are included in the additional field information of the audio code stream and participant identities corresponding to the at least two locations of the voice sources have been identified during last voiceprint identification, write the identified participant identities corresponding to the two locations of the voice sources into the additional field information of the audio code stream by using the second transmitter 063.

According to a recording server provided in this embodiment of the present invention, an audio code stream of a conference site and additional field information of the audio code stream are received from a multipoint control unit, where the additional field information of the audio code stream includes a location of a voice source corresponding to the audio code stream; audio data decoded from the audio code stream is stored in a code stream file to which a conference site number to which the audio code stream belongs and the location of the voice source corresponding to the audio code stream correspond; the code stream file is sent to a voiceprint identification system; a voiceprint identification result is received from the voiceprint identification system; and a participant identity that corresponds to the location of the voice source corresponding to the audio data is written into additional field information of the audio data. Therefore, voiceprint identification can be performed for the audio data in the conference site according to speaker locations. This improves accuracy of the voiceprint identification and further improves reliability of classification of voice conference minutes.

Figure 10:
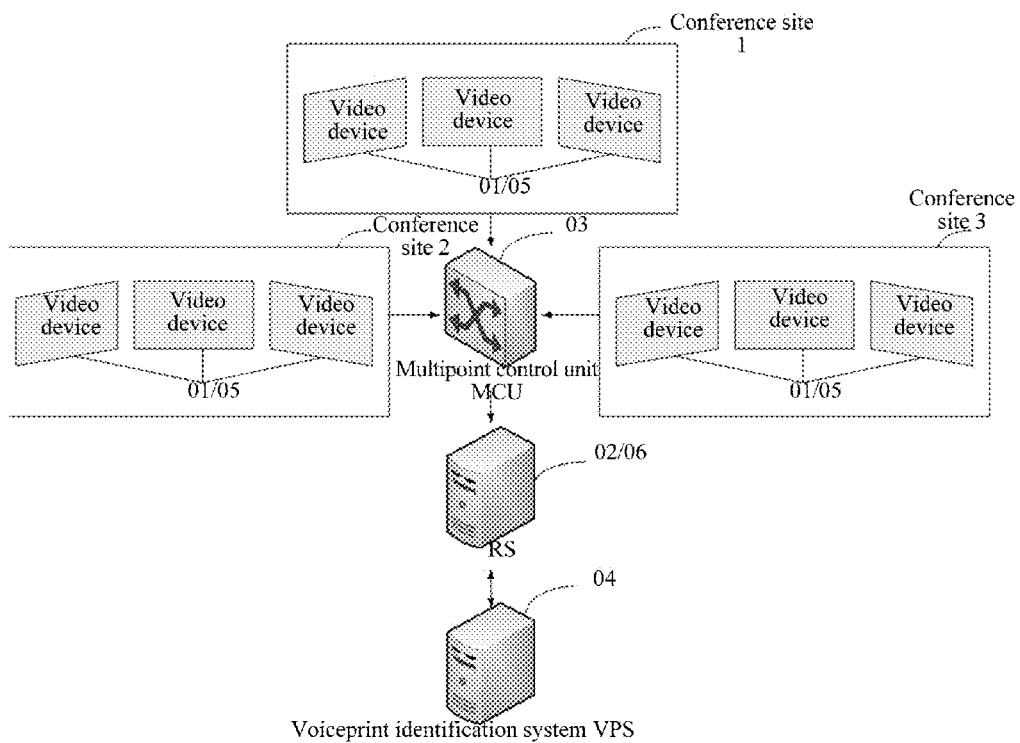
FIG. 10 is a schematic structural diagram of a video conference system according to still another embodiment of the present invention.

As shown in FIG. 10, still another embodiment of the present invention provides a video conference system 1, including a multipoint control unit 03 and a voiceprint identification system 04, and the video conference system 1 further includes the video device 01 and the recording server 02 or the video device 05 and the recording server 06 that are provided in the forgoing embodiments.

According to the video conference system provided in this embodiment of the present invention, voice source locating is performed according to audio data of a conference site so as to acquire a location of a voice source corresponding to the audio data; the location of the voice source is written into additional field information of the audio data; a voice activation flag is written into the additional field information, where the voice activation flag is an active flag or an inactive flag; the audio data is packaged as an audio code stream and the audio code stream and the additional field information of the audio code stream are sent to the recording server. In this way, the recording server classifies the audio data according to the additional field information, writes participant identity that corresponds to the location of the voice source corresponding to the audio data into the additional field information of the audio code stream, and is capable of performing voiceprint identification on the voice data in the conference data according to a speaker location. This improves accuracy of the voiceprint identification and further improves reliability of classification of voice conference minutes.

In the several embodiments provided in the present application, it should be understood that the disclosed method, device, and system may be implemented in other manners. For example, the described device embodiment is merely exemplary. For example, the division of the units is merely logical function division and other division manners may be used in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

In addition, functional units in the embodiments of the present invention may be integrated into one processing unit, or each of the units may exist alone physically, or two or more units are integrated into one unit. The unit may be implemented in the form of hardware, or may be implemented in the form of hardware plus a software functional unit.

All or a part of the steps in the method embodiments may be implemented by a program instructing relevant hardware. The program may be stored in a computer readable storage medium. When the program is run, the steps in the method embodiment are performed. The storage medium may be any medium that is capable of storing program codes, such as a USB flash disk, a removable hard disk, a read-only memory (Read Only Memory, ROM), a random access memory (Random Access Memory, RAM), a magnetic disk, or an optical disk.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for classifying voice conference minutes, comprising:

performing voice source locating according to audio data of a conference site so as to acquire a location of the voice source corresponding to the audio data, and writing the location of the voice source into additional field information of the audio data, wherein the additional field information includes a voice activation flag field that indicates whether the audio data is voice data or if the audio data is not voice data; and packaging the audio data as an audio code stream and sending the audio code stream and the additional field information to a recording server, so that the recording server classifies the audio data according to the additional field information.

2. The method according to claim 1, before the packaging the audio data as the audio code stream and sending the audio code stream and the additional field information of the audio code stream to the recording server, the method further comprises:

writing a voice activation flag into the additional field information, wherein the voice activation flag is an active flag or an inactive flag, so that the recording server performs detection on the voice activation flag in the additional field information of the audio data before sending decoded audio data to a voiceprint identification system and sends the audio data to the voiceprint identification system when the voice activation flag is the active flag.

3. The method according to claim 2, wherein the writing the voice activation flag into the additional field information comprises:

performing voice activation detection on the audio data to identify whether the audio data is voice data; if the audio data is the voice data, writing the voice activation flag into the additional field information as the active flag; and if the audio data is not the voice data, writing the voice activation flag into the additional field information as the inactive flag.

4. A method for classifying voice conference minutes, comprising:

receiving an audio code stream of a conference site and additional field information of the audio code stream from a multipoint control unit, wherein the additional field information of the audio code stream comprises a location of a voice source corresponding to the audio code stream, and wherein the additional field information includes a voice activation flag field that indicates whether the audio data is voice data or if the audio data is not voice data;

storing audio data decoded from the audio code stream in a code stream file, wherein a conference site number to which the audio code stream belongs and the location of the voice source corresponding to the audio code stream correspond to the code stream file, and sending the audio data in the code stream file to a voiceprint identification system; and receiving a voiceprint identification result from the voiceprint identification system, wherein the voiceprint identification result comprises a participant identity that corresponds to the location of the voice source corresponding to the audio data, and writing the participant identity that corresponds to the location of the voice source corresponding to the audio data into the additional field information of the audio code stream.

5. The method according to claim 4, after the storing the audio data decoded from the audio code stream in the code stream file, the method further comprises:

writing time information of the audio code stream into the additional field information of the audio code stream, so that when at least two audio code streams are received, the at least two audio code streams are sequenced according to the time information.

6. The method according to claim 4, wherein the sending the audio data in the code stream file to the voiceprint identification system; the receiving the voiceprint identification result from the voiceprint identification system, further comprises:

sending audio data that is within a first unit time in the code stream file to the voiceprint identification system; and receiving the voiceprint identification result from the voiceprint identification system, wherein the voiceprint identification result comprises a participant identity that corresponds to a location of a voice source corresponding to the audio data that is within the first unit time, and writing the participant identity that corresponds to the location of the voice source corresponding to the audio data that is within the first unit time into additional field information of the audio data that is within the first unit time.

7. The method according to claim 5, wherein the sending the audio data in the code stream file to the voiceprint identification system; the receiving the voiceprint identification result from the voiceprint identification system, further comprises:

sending audio data that is within a first unit time in the code stream file to the voiceprint identification system; and receiving the voiceprint identification result from the voiceprint identification system, wherein the voiceprint identification result comprises a participant identity that corresponds to a location of a voice source corresponding to the audio data that is within the first unit time, and writing the participant identity that corresponds to the location of the voice source corresponding to the audio data that is within the first unit time into additional field information of the audio data that is within the first unit time.

8. The method according to claim 6, before the receiving the voiceprint identification result from the voiceprint identification system, further comprising:

sending a voiceprint identification result of audio data that is within a second unit time in the code stream file to the voiceprint identification system, wherein the second unit time is a previous unit time to the first unit time, so that the voiceprint identification system uses the voiceprint identification result of the audio data that is within the second unit time as a reference when performing voiceprint identification on the audio data that is within the first unit time.

9. The method according to claim 7, before the receiving the voiceprint identification result from the voiceprint identification system, further comprising:

sending a voiceprint identification result of audio data that is within a second unit time in the code stream file to the voiceprint identification system, wherein the second unit time is a previous unit time to the first unit time, so that the voiceprint identification system uses the voiceprint identification result of the audio data that is within the second unit time as a reference when performing voiceprint identification on the audio data that is within the first unit time.

10. The method according to claim 6, before the sending the audio data in the code stream file to the voiceprint identification system, further comprising:

detecting the additional field information of the audio data that is within the first unit time, and if voice activation flags in all additional field information of the audio data that is within the first unit time are inactive flags, skipping sending the audio data that is within the first unit time to the voiceprint identification system.

11. The method according to claim 4, before the sending the audio data in the code stream file to the voiceprint identification system, further comprising:

detecting the location of the voice source in the additional field information of the audio code stream;

if only one location of the voice source corresponding to the audio code stream exists in the additional field information of the audio code stream, sending the code stream file to the voiceprint identification system; and if at least two locations of voice sources corresponding to the audio code stream are comprised in the additional field information of the audio code stream and participant identities corresponding to the at least two locations of the voice sources have been identified during last voiceprint identification, writing the identified participant identities corresponding to the at least two locations of the voice sources into the additional field information of the audio code stream.

12. A video device, comprising:

a location acquiring unit, configured to perform voice source locating according to audio data of a conference site so as to acquire a location of a voice source corresponding to the audio data, write the location of the voice source into additional field information of the audio data, and send the audio data and the additional field information of the audio data to a sending unit, wherein the additional field information includes a voice activation flag field that indicates whether the audio data is voice data or if the audio data is not voice data; and the sending unit, configured to receive the audio data and the additional field information of the audio data from the location acquiring unit, package the audio data as an audio code stream, and send the audio code stream and the additional field information of the audio code stream to a recording server, so that the recording server classifies the audio data according to the additional field information.

13. The video device according to claim 12, further comprising:

a flag writing unit, configured to write a voice activation flag into the additional field information, wherein the audio activation flag is an active flag or an inactive flag, so that the recording server performs detection on the voice activation flag in the additional field information of the audio data before sending decoded audio data to a voiceprint identification system and sends the audio data to the voiceprint identification system when the voice activation flag is the active flag.

14. The video device according to claim 13, wherein the flag writing unit is configured to:
perform voice activation detection on the audio data to identify whether the audio data is voice data; if the audio data is the voice data, write the voice activation flag into the additional field information as the active flag; and if the audio data is not the voice data, write the voice activation flag into the additional field information as the inactive flag.

15. A recording server, comprising:
a receiving unit, configured to receive an audio code stream of a conference site and additional field information of the audio code stream from a multipoint control unit, wherein the additional field information of the audio code stream comprises a location of a voice source corresponding to the audio code stream, and wherein the additional field information includes a voice activation flag field that indicates whether the audio data is voice data or if the audio data is not voice data, and send the audio code stream to a classification and identification unit;
the classification and identification unit, configured to receive the audio code stream from the receiving unit, store audio data decoded from the audio code stream in a code stream file, wherein a conference site number to which the audio code stream belongs and the location of the voice source corresponding to the audio code stream correspond to the code stream file, and send the audio data in the code stream file to a voiceprint identification system; and
an identity matching unit, configured to receive a voiceprint identification result from the voiceprint identification system, wherein the voiceprint identification result comprises a participant identity that corresponds to the location of the voice source corresponding to the audio data, and write the participant identity that corresponds to the location of the voice source corresponding to the audio data into the additional field information of the audio code stream.

16. The recording server according to claim 15, further comprising:
a sequencing unit, configured to write time information of the audio code stream into the additional field information of the audio code stream, so that when at least two audio code streams are received, the at least two audio code streams are sequenced according to the time information.

17. The recording server according to claim 15, wherein:
the classification and identification unit is configured to send audio data that is within a first unit time in the code stream file to the voiceprint identification system; and
the identity matching unit is configured to receive the voiceprint identification result from the voiceprint identification system, wherein the voiceprint identification result comprises a participant identity that corresponds to a location of a voice source corresponding to the audio data that is within the first unit time, and write the participant identity that corresponds to the location of the voice source corresponding to the audio data that is within the first unit time into additional field information of the audio data that is within the first unit time.

18. The recording server according to claim 16, wherein:
the classification and identification unit is configured to send audio data that is within a first unit time in the code stream file to the voiceprint identification system; and
the identity matching unit is configured to receive the voiceprint identification result from the voiceprint identification system, wherein the voiceprint identification result comprises a participant identity that corresponds to a location of a voice source corresponding to the audio data that is within the first unit time, and write the participant identity that corresponds to the location of the voice source corresponding to the audio data that is within the first unit time into additional field information of the audio data that is within the first unit time.

19. The recording server according to claim 17, wherein:
the classification and identification unit is further configured to send a voiceprint identification result of audio data that is within a second unit time in the code stream file to the voiceprint identification system, wherein the second unit time is a previous unit time to the first unit time, so that the voiceprint identification system uses the voiceprint identification result of the audio data that is within the second unit time as a reference when performing voiceprint identification on the audio data that is within the first unit time.

20. The recording server according to claim 17, wherein, before sending the audio data in the code stream file to the voiceprint identification system, the classification and identification unit is further configured to:
detect the additional field information of the audio data that is within the first unit time, and if voice activation flags in all additional field information of the audio data that is within the first unit time are inactive flags, skip sending the audio data that is within the first unit time to the voiceprint identification system.

21. The recording server according to claim 19, wherein, before sending the audio data in the code stream file to the voiceprint identification system, the classification and identification unit is further configured to:
detect the additional field information of the audio data that is within the first unit time, and if voice activation flags in all additional field information of the audio data that is within the first unit time are inactive flags, skip sending the audio data that is within the first unit time to the voiceprint identification system.

22. The recording server according to claim 15, wherein, before sending the audio data in the code stream file to the voiceprint identification system,
the classification and identification unit is further configured to detect a location of a voice source in the additional field information of the audio code stream;
if only one location of the voice source corresponding to the audio code stream exists in the additional field information of the audio code stream, the classification and identification unit is further specifically configured to send the code stream file to the voiceprint identification system; and
if at least two locations of voice sources corresponding to the audio code stream are comprised in the additional field information of the audio code stream and participant identities corresponding to the at least two locations of the voice sources have been identified during last voiceprint identification, the identity matching unit is further specifically configured to write the identified participant identities corresponding to the at least two locations of the voice sources into the additional field information of the audio code stream.

* * * * *

UNITED STATES PATENT AND TRADEMARK OFFICE
CERTIFICATE OF CORRECTION

PATENT NO. : 8,838,447 B2  
APPLICATION NO. : 14/093127  
DATED : September 16, 2014  
INVENTOR(S) : Wuzhou Zhan Page 1 of 1

It is certified that error appears in the above-identified patent and that said Letters Patent is hereby corrected as shown below:

Title Page, Item (71), "Guangdong (CN)" should read -- Shenzhen (CN) --.

Signed and Sealed this
Tenth Day of February, 2015

Michelle K. Lee
*Deputy Director of the United States Patent and Trademark Office*